United States Patent [19]

Price et al.

[11] 3,792,193
[45] Feb. 12, 1974

[54] DUAL BUSHING CAPACITOR TERMINAL ASSEMBLY

[75] Inventors: Frank D. Price, South Glens Falls; Richard G. Conners, Glens Falls, both of N.Y.

[73] Assignee: General Electric Company, Hudson Falls, N.Y.

[22] Filed: Sept. 14, 1972

[21] Appl. No.: 289,174

[52] U.S. Cl. ............................................ 174/153 R
[51] Int. Cl. ...................... H01g 1/14, H01b 17/30
[58] Field of Search............ 174/50.56, 52 S, 153 R; 339/126 R, 126 S, 214 R, 214 C, 218 R, 218 C, 275 A, 278 A

[56] References Cited
UNITED STATES PATENTS

| | | | |
|---|---|---|---|
| 1,546,855 | 7/1925 | Montsinger | 174/153 R X |
| 2,450,273 | 9/1948 | Dubilier | 174/153 R |
| 3,015,687 | 1/1962 | Ruscito | 174/153 R |
| 3,023,268 | 2/1962 | Preiser et al. | 174/153 R |
| 3,172,945 | 3/1965 | Wyman | 174/153 R X |

FOREIGN PATENTS OR APPLICATIONS

| | | | |
|---|---|---|---|
| 951,905 | 4/1949 | France | 174/153 R |
| 965,510 | 6/1957 | Germany | 174/153 R |

OTHER PUBLICATIONS

"A Few Facts About Motor Capacitor Terminals", Sprague Electric Co. Ad in Electro–Technology, Vol. 67 No. 3, Mar. 1961, page 167.

*Primary Examiner*—Laramie E. Askin

[57] ABSTRACT

A dual bushing terminal assembly is disclosed for capacitors. The dual bushing comprises a pair of separate capacitor electrical terminals molded or cast in a single piece of an insulating material, and the dual bushing assembly is then sealed in a capacitor cover.

4 Claims, 1 Drawing Figure

PATENTED FEB 12 1974
3,792,193
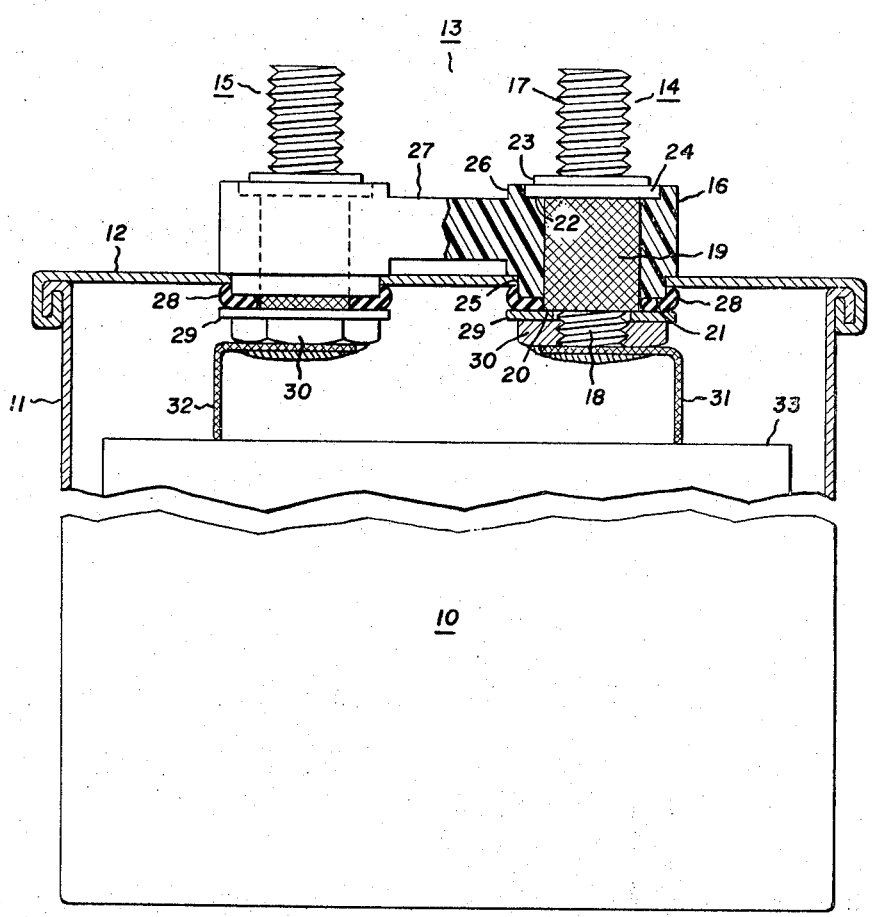

3,792,193

DUAL BUSHING CAPACITOR TERMINAL ASSEMBLY

BACKGROUND OF THE INVENTION

Those capacitors to which this invention is particularly directed are known as dielectric liquid impregnated capacitors. These capacitors are specifically related to high frequency capacitors and those capacitors associated with silicon controlled rectifiers, known SCR capacitors, which utilize terminal and bushing means capable of carrying electrical currents of a very high amperage. For example, a common SCR capacitor may utilize bushings and terminals capable of carrying 100 amperes of current. Accordingly, the terminals are well insulated, and generally comprise a two-piece central metal terminal or stud passing through an insulating bushing which is then sealed in a capacitor cover. Because of the high amperage carrying capacity of these bushings, the central terminal is a relatively large metal conductor and a threaded external electrical connector is employed for appropriate lead attachment. The central terminal is usually subjected to severe torquing stresses in tightening the connector nut to connect the capacitor leads to the terminal. This leads to stress cracking of the bushings and loosening of the terminals. Consequently, failures of the capacitor by reason of damaged bushings are prevalent.

Accordingly, it is an object of this invention to provide an improved bushing assembly.

It is a further object of this invention to provide an improved bushing assembly with improved torque resistance and seal characteristics.

SUMMARY OF THE INVENTION

A proposed solution of the above noted problems in accordance with the present invention is the provision of a dual bushing assembly wherein both terminals necessary for a SCR capacitor are molded or cast into and integrally joined with a single piece insulating material. This dual bushing also provides an improved dual seal with a capacitor cover at the same time. The interjoining of the two terminals in a single piece and the sealing characteristics of the dual bushing assembly in a capacitor cover provides a far greater increase in torque resistance than the individual bushings of the prior art.

BRIEF DESCRIPTION OF THE DRAWINGS

This invention will be better understood when taken in connection with the following description and the drawings in which:

The single FIGURE discloses an exemplary embodiment of this invention as utilized in a SCR capacitor.

DESCRIPTION OF THE PREFERRED EMBODIMENTS

Referring now to the single FIGURE, there is illustrated a common SCR capacitor 10 comprising generally a casing 11, a metal cover 12, and a dual bushing assembly 13 of this invention mounted in the cover 12. The dual bushing assembly 13 provides an electrical connection externally of the capacitor through the dual terminals in the bushing and then through a pair of electrodes within the capacitor roll section in the capacitor casing 11.

The dual bushing assembly 13 comprises a pair of metal conductor inserts 14 and 15 and an insulating material base 16 which is substantially non-resilient. Each terminal 14 and 15 is similar in all respects so that a description of one suffices for the other. Terminal 14 includes a first threaded part 17 which is adapted to be external to the capacitor casing. A second threaded part 18 is adapted to be internal of the capacitor casing. An intermediate part 19 of terminal 14 is a portion of enlarged diameter with an externally knurled surface. It is the intermediate knurled part which is adapted to be imbedded in the insulating material 16. The knurled part 19 of terminal 14 includes a shoulder member 20 thereon. The insulating material 16 is spaced from one end of the knurled portion 19 and defines therewith a composite shoulder 21. Upper shoulder members 22 and 23, are defined by a radially extending flange 24. Terminals 14 and 15 are placed within a suitable mold and an insulating material is poured into the mold to be passed about the terminals. A preferred insulating material is a phenolic thermosetting compound, although other plastics, epoxies or ceramics may be employed.

The insulating material and the mold provide for a circular insulating material shoulder 25 surrounding each terminal enlarged portion 19. This insulating material shoulder 25 is adapted to be inserted into a suitable aperture within the can cover 12. The insulating material 16 also is caused to flow upwardly and around shoulder 22 to provide a reinforcing annular wall 26 surrounding the enlarged portion 19 and flange 24. The annular wall 26 is lower than the shoulder 23 on the knurled part 19. When a nut is threaded on stud 14 over or under a connector lead, the exposed shoulder will carry the full brunt of imposed force rather than have any part of the force carried by the insulating material 16.

As can be seen in the drawing, the pair of similar terminal assemblies 14 and 15 are joined by an integral web 27 of the insulating material 16. This web comprises a thin section having a vertical dimension less than the vertical dimension of the insulating material in close proximity and surrounding relationship to the knurled part 19 of terminal 14. This means that in the final assembly of the bushing assembly to the cover the intermediate web portion 27 is raised or spaced from the surface of the can cover 12. This structure provides an important clean space and air space between the terminals as well as improving the sealing characteristics.

Although the dual bushing assembly is a one-piece construction, a dual seal assembly is utilized for mounting the dual bushing in a capacitor can cover. In order to effectively seal the bushing assembly 13 to the can cover 12, a seal ring gasket 28 is placed over the shoulder 21 and thereafter a washer 29 and nut 30 are placed on the threaded portion 18 of the terminal 14 and threaded to compress the gasket 28 material to provide an effective fluid seal. Shoulders 20 and 21 are so dimensioned that the seal ring or gasket 28, which is preferably an elastomeric material, is compressed only a predetermined amount and takes up the configuration as illustrated, which had been found to be more satisfactory for sealing purposes. This seal is a dual seal in that it cooperatively seals the juncture between the insulating material shoulder 25 and the case cover 12 as well as that juncture between the knurled portion 19 of the terminal 14 and the surrounding insulating material 16. After the bushing assembly is mounted to the cover 12, the cover 12 is then mounted to the capacitor casing 11. Prior to assembling the cover 12 to the casing 11, capacitor leads 31 and 32 from the capacitor roll section 33 are soldered or brazed to the lower surface of the threaded terminal portion 18.

It can be seen by this invention that there is provided a high current carrying bushing comprising a dual terminal arrangement intra-connected by means of an insulating material. The two terminals in their cooperative relationship provide an increased torque resisting structure where the torque resistance is divided between the knurled portion of the terminals and surrounding insulating material, and the strength of the intermediate web. Since the intermediate web is available to take up part of the torque resistance, the stresses on the insulating material surrounding the knurled portion have been reduced and torque failure problems have been essentially overcome. The invention is particularly applicable for SCR capacitors which require high amperage carrying terminals. These capacitors are usually high frequency capacitors where the terminals and cover are of non-magnetic materials, aluminum, for example, with which sealing and torque problems are more severe.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patents of the United States is:

1. A dual bushing assembly for a capacitor comprising in combination
   a. an electrically conductive capacitor cover member
   b. a dual bushing assembly sealed in said cover and comprising
      1. a pair of spaced terminal means
      2. each of said terminal means comprising a stud member having threaded portions at each end thereof and an intermediate enlarged portion
      3. said enlarged portion having a radially extending flange at its upper end and a lower shoulder at its lower end
      4. a substantially non-resilient insulating material cast about said enlarged portion and interconnecting said terminals and defining a composite shoulder with said enlarged portion at the lower end thereof
      5. said insulating material defining a web section between said terminals which is spaced from said cover
      6. said insulating material surrounding said flange portion
   c. said cover defining a pair of apertures through which the lower threaded portions of said terminals project
   d. a circular insulating material shoulder means on said insulating material around the enlarged portion of each of said terminals
   e. said circular insulating material shoulder means engaging the cover about said apertures
   f. a ring seal on said composite shoulder and covering the juncture between said circular insulating material shoulder means and said cover
   g. a washer next adjacent said ring seal and abutting said lower shoulder at said lower threaded portion of said stud, and
   h. a nut threaded on said terminal compressing said washer against said seal and said lower shoulder.

2. The invention as recited in claim 1 wherein said insulating material is a thermosetting resin.

3. The invention as recited in claim 1 wherein said terminals are single piece terminals.

4. The invention as recited in claim 1 wherein said insulating material is a phenolic compound.

* * * * *